United States Patent
Zhu et al.

(10) Patent No.: US 11,540,020 B2
(45) Date of Patent: Dec. 27, 2022

(54) METHOD FOR REALIZING VIDEO INFORMATION PREVIEW, CLIENT AND STORAGE MEDIUM

(71) Applicant: ZTE CORPORATION, Guangdong (CN)

(72) Inventors: Xingchang Zhu, Guangdong (CN); Jia Cao, Guangdong (CN); Guozhu Liang, Guangdong (CN); Jianhua Kong, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 164 days.

(21) Appl. No.: 16/626,333

(22) PCT Filed: Sep. 6, 2018

(86) PCT No.: PCT/CN2018/104412
§ 371 (c)(1),
(2) Date: Dec. 24, 2019

(87) PCT Pub. No.: WO2019/062514
PCT Pub. Date: Apr. 4, 2019

(65) Prior Publication Data
US 2020/0120394 A1 Apr. 16, 2020

(30) Foreign Application Priority Data
Sep. 30, 2017 (CN) .......................... 201710929087.4

(51) Int. Cl.
*H04N 7/173* (2011.01)
*H04N 21/472* (2011.01)
(Continued)

(52) U.S. Cl.
CPC ..... *H04N 21/47202* (2013.01); *H04N 21/435* (2013.01); *H04N 21/4316* (2013.01); *H04N 21/47217* (2013.01)

(58) Field of Classification Search
CPC ......... H04N 21/47202; H04N 21/4316; H04N 21/435; H04N 21/47217; H04N 21/23439;
(Continued)

(56) References Cited

U.S. PATENT DOCUMENTS

2009/0164601 A1* 6/2009 Swartz ............... H04N 21/4316
709/217
2011/0191679 A1 8/2011 Lin et al.
(Continued)

FOREIGN PATENT DOCUMENTS

| CN | 102576248 A | 7/2012 |
| CN | 102932679 A | 2/2013 |

(Continued)

OTHER PUBLICATIONS

Extended Search Report of Counterpart European Patent Application No. 18860416.9 dated May 20, 2021.
(Continued)

*Primary Examiner* — Gigi L Dubasky (57) ABSTRACT

Provided are a method for realizing a video information preview, a client and a storage medium. The method for realizing a video information preview comprises: when it is detected that a progress bar is dragged, according to position information about dragging, positioning (100) corresponding preview information from a description file, wherein the description file is used for describing the preview information; and presenting (101) the positioned preview information.

10 Claims, 6 Drawing Sheets

(51) Int. Cl.
*H04N 21/431* (2011.01)
*H04N 21/435* (2011.01)

(58) Field of Classification Search
CPC ........... H04N 21/4312; H04N 21/8456; H04N 21/234363; H04N 21/44218; H04N 21/462
See application file for complete search history.

(56) References Cited

U.S. PATENT DOCUMENTS

| | | | |
|---|---|---|---|
| 2012/0070129 A1* | 3/2012 | Lin | H04N 21/47202 386/278 |
| 2014/0095593 A1* | 4/2014 | Wei | H04L 65/613 709/203 |
| 2014/0105576 A1* | 4/2014 | Lou | H04N 21/47217 386/241 |
| 2014/0282262 A1* | 9/2014 | Gregotski | H04N 21/8549 715/838 |
| 2016/0321781 A1* | 11/2016 | Mann | H04N 21/4728 |
| 2016/0365126 A1* | 12/2016 | Dalimba | H04N 21/8455 |
| 2018/0205976 A1* | 7/2018 | Xue | H04N 21/24 |

FOREIGN PATENT DOCUMENTS

| | | |
|---|---|---|
| CN | 106028068 A | 10/2016 |
| CN | 106998493 A | 8/2017 |

OTHER PUBLICATIONS

International search report of PCT Patent Application No. PCT/CN2018/104412 dated Nov. 16, 2018.

\* cited by examiner

METHOD FOR REALIZING VIDEO INFORMATION PREVIEW, CLIENT AND STORAGE MEDIUM

FIELD OF THE INVENTION

The present disclosure relates to, but is not limited to, the technical field of multimedia, and in particular, to a method and an apparatus for realizing a video information preview, a client and a storage medium.

BACKGROUND OF THE INVENTION

With the rapid development of the mobile internet, the Over-The-Top (OTT) service has developed rapidly, and the traditional Digital Video Broadcasting (DVB) and Internet Protocol Television (IPTV) have gradually evolved toward pure OTT services, wherein, the OTT service is an abbreviation of the Over-the-Top service, which usually refers that the content or service is constructed on the basic telecommunication service so that an extra support of a network operator is not needed. When a user watches a video, the user can realize dragging and playing of the video by means of dragging the progress bar, and in order to improve the experience of the user, the user can learn the video scene of the dragging point by previewing the poster during the dragging process, and switch the video to the position where the user is interested in for playing.

Currently, many OTT services have implemented similar functions, but they are all implemented in a private mode of the application (APP) client and the Content Delivery Network (CDN). For example, when a user drags a progress bar, the client pulls a video code stream from the CDN according to the time point where dragging is located, until the picture corresponding to the first I frame is solved from the code stream and displayed to the user, so as to realize the preview of the video poster. For another example, when creating content, the encoder uses the function of thumbnails to extract posters from the content; the posters are named or formed into an oversized poster according to the fragmentation rule; when dragging the progress bar, the client locates the corresponding poster according to the currently played fragment, and then downloads the poster from CDN for presentation so as to achieve the preview of the video poster, wherein Thumbnails represent the situation segment function, and are industry standard terms for encoders.

In related technologies, no matter what kind of implementation solution, there is a problem of a close cooperation between the client and the CDN, and it needs to be implemented by the player of the client. The drag control of the progress bar is implemented by the APP client page, and thus in order to implement dragging the preview poster, the player must provide a private interface to the page, so that the client can obtain the currently played fragment and position of the program. Since the player is generally a third-party commercial player or a system native player, such an implementation mode may cause difficulty in promotion of services; in addition, the current solution can only provide a preview poster in one size, and cannot adapt to the requirements for presenting various client pages in different sizes.

SUMMARY OF THE INVENTION

In order to solve the above technical problem, the embodiments of the present disclosure provide a method and an apparatus for realizing a video information preview, a client and a storage medium, which can be independently implemented at a client and facilitate the promotion of services.

According to an embodiment of the present disclosure, a method for realizing a video information preview is provided, including:

positioning, when it is detected that a progress bar is dragged, corresponding preview information from a description file according to position information about dragging, wherein the description file is used for describing the preview information; and presenting positioned preview information.

As an exemplary embodiment, when a video is played, the description file of the video played is pulled down from a server;

or, when it is detected that the progress bar is dragged, the description file of the video played is pulled down from a server.

As an exemplary embodiment, sizes of segments of the preview information include one or more types.

As an exemplary embodiment, index documents for the preview information include one or more index files, wherein the one or more index files are used to describe primary index information and sub-index information.

As an exemplary embodiment, the preview information includes a poster; the index documents for the preview information include a poster primary index file and a sub-index description file;

where, the sub-index description file is a sub-description index file corresponding to different resolutions in the poster primary index file; the segments are segment fragments at different time points corresponding to the resolutions.

As an exemplary embodiment, the method further includes: when a program is played, downloading the poster primary index file of the program, and finding the sub-index description file matching a client presentation from the poster primary index file;

said positioning corresponding preview information from a description file according to position information about dragging includes:

according to the position information about dragging, parsing a corresponding poster file name from the sub-index description file matching the client presentation;

downloading a poster segment in a corresponding size in the poster based on a parsed poster file name.

According to another embodiment of the present disclosure, a client is further provided, including a processing module, a presentation module and a storage module, wherein, the storage module is configured to store a description file, wherein the description file is used for describing preview information;

the processing module is configured to position corresponding preview information from the description file according to position information about dragging, when it is detected that a progress bar is dragged;

the presentation module is configured to present positioned preview information.

As an exemplary embodiment, the client further includes: a pull-down module, configured to, when a video is played, pull down from a server the description file of the video played;

or, configured to, when it is detected that the progress bar is dragged, pull down from a server the description file of the video played.

As an exemplary embodiment, index documents for the preview information includes one or more index files, wherein the one or more index files are used to describe primary index information and sub-index information.

As an exemplary embodiment, the preview information includes a poster; the index documents for the preview information corresponding to the preview information comprise a poster primary index file and a sub-index description file; the processing module is configured to:

when a program is played by the client where the processing module itself is located, download the poster primary index file of the program, and find the sub-index description file matching a client presentation from the poster primary index file;

when a preview poster needs to be presented, according to the position information about dragging, parse a corresponding poster file name from the sub-index description file matching the client presentation, and download a poster segment in a corresponding size in the poster based on a parsed poster file name.

According to yet another embodiment of the present disclosure, a computer readable storage medium is provided, storing computer executable instructions, which are used to execute the method for realizing a video information preview as described above.

According to still another embodiment of the present disclosure, an apparatus for realizing a video information preview is further provided, including a processor, a memory, and a computer program stored on the memory and executable on the processor: when it is detected that a progress bar is dragged, positioning corresponding preview information from a description file according to position information about dragging, wherein the description file is used for describing the preview information; and presenting positioned preview information.

According to the solution described in the embodiment of the present disclosure, when it is detected that a progress bar is dragged, corresponding preview information is positioned from a description file according to position information about dragging, wherein the description file is used for describing the preview information; and presenting positioned preview information.

Through the solution, the video information preview is independently completed at the client, without the participation of a player and a CDN, thus facilitating the promotion of services.

Further, some embodiments of the present disclosure meet the presentation requirements of various clients by defining the segments of video preview information in different sizes.

Other features and advantages of the embodiments of the present disclosure will be set forth in the following description, and will become apparent in part from the description, or will be understood by implementing the embodiments of the present disclosure. The objectives and other advantages of the embodiments of the present disclosure can be realized and obtained by the structures particularly pointed out in the description, claims and accompanying drawings.

BRIEF DESCRIPTION OF THE DRAWINGS

The accompanying drawings are used to provide a further understanding of the technical solutions of the present disclosure, and constitute a part of the description. Together with the embodiments of the present disclosure, the accompanying drawings are used to explain the technical solutions of the present disclosure, and do not constitute a limitation on the technical solutions of the present disclosure.

DETAILED DESCRIPTION OF EMBODIMENTS

Hereinafter, the present disclosure will be described in detail with reference to the accompanying drawings and in combination with the embodiments. It should be noted that, without conflict, the embodiments in the present disclosure and the features in the embodiments may be combined with each other.

It should be noted that the terms "first", "second", and so on in the description, the claims and the aforesaid accompanying drawings in the present disclosure are used to distinguish similar objects, and are not necessarily used to describe a specific order or sequence.

In order to make the objectives, technical solutions and advantages of the embodiments of the present disclosure clearer, the embodiments of the present disclosure will be described in detail in the following with reference to the accompanying drawings. It should be noted that, without conflict, the embodiments in the present disclosure and the features in the embodiments may be arbitrarily combined with each other.

Figure 1:
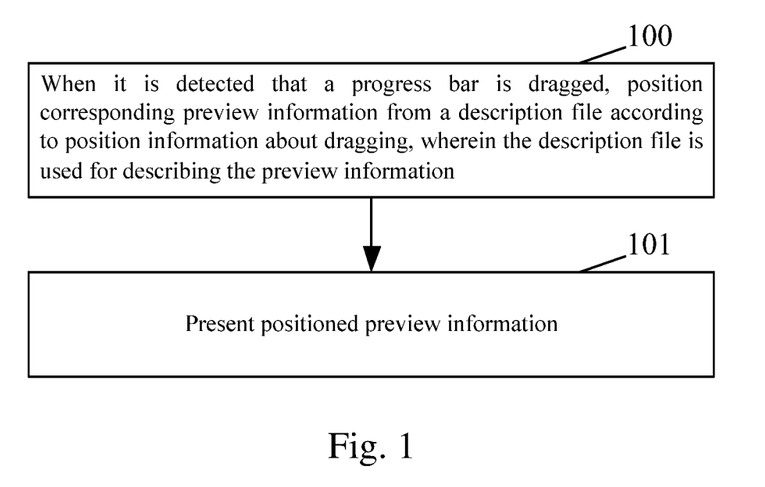
FIG. 1 is a flowchart of a method for realizing a video information preview in an embodiment of the present disclosure.

FIG. 1 is a flowchart of a method for realizing a video information preview in an embodiment of the present disclosure. As shown in FIG. 1, the method includes the following steps:

at step 100, when it is detected that a progress bar is dragged, corresponding preview information is positioned from a description file according to position information about dragging, wherein the description file is used for describing the preview information.

When a video is played, the client may pull down from a server the description file for describing preview information of the video played;

When it is detected that the progress bar is dragged, the client may also pull down from a server the description file for describing preview information of the video played.

Correspondingly, on the preview server side, the method further includes: describing the preview information using the description file.

When the content (including a live broadcast code stream) is injected into the CDN, firstly, a VOD (Video On Demand) program is downloaded from a film library or a live broadcast channel code stream is received; next, the preview information is extracted through FFmpeg in real time (for example every preset duration such as 10 seconds), and as an exemplary embodiment, in order to improve the efficiency, the preview information is best extracted according to a key frame (I frame) position; the time stamp for extracting the preview information is recorded; and then, according to the extracted preview information, a segment of the preview information is generated through an Opencv (Open Source Computer Vision Library). Among them, FFmpeg is a free software, and may run video recording, conversion and streaming functions of various formats of audio and video. After the preview information is generated, the corresponding relationships between the preview information itself, the content unique identifier (CID) (storing the external CID), the time information such as a time stamp, and the segment are saved in the database, and an index document for the preview information of the program is generated.

As an exemplary embodiment, the size of the segment of the preview information may be a fixed type.

As an exemplary embodiment, the size of the segment of the preview information may also be segments in multiple sizes generated as required, and the segments in different sizes correspond to the virtual slice files of the segment data of different resolutions. Some embodiments of the present disclosure meet the presentation requirements of various clients by defining the video preview information in different sizes.

As an exemplary embodiment, the preview information may include a poster.

As an exemplary embodiment, index documents for the preview information include one or more index files, where the one or more index files are used to describe primary index information and sub-index information. For example, the index documents for the preview information may include a poster primary index file and a sub-index description file.

An example of the storage format of the description file is shown in Table 1:

TABLE 1

--/path/cpid/cid/
----main.zti
----poster-1.zti
----poster-1.ztd
----poster-2.zti
----poster-2.ztd
......

As shown in Table 1, main.zti is a poster primary index file; the other *.zti's are sub-description index files corresponding to different resolutions in the poster primary index file main.zti; and the *.ztd files are segment fragments at different time points corresponding to the resolutions, i.e. the virtual slice files of the segment data.

In the embodiment of the present disclosure, an index file may be described in a text format, where an example of the poster primary index file is shown in Table 2:

TABLE 2

\<ZThumbnailStreamList\>
\<Stream url="poster-1.zti"mimeType="image/jpeg" width="160" height="120"/\>
\<Stream url="poster-2.zti"mimeType="image/jpeg" width="1280" height="720"/\>

The poster primary index file as shown in Table 2 includes two sub-description index files as shown in Table 1, where it is given in the sub-description index file poster-1.zti that a resolution of the picture or mapping is 160*120; and it is given in the sub-description index file poster-2.zti that a resolution of the picture or mapping is 1280*720.

An example of the sub-description index file is shown in Table 3:

TABLE 3

\<ZThumbnailStreammimeType="image/jpeg" width="160" height="120"maxduration="10"\>
\<Period start="PT0S"\>
  \<SegmentTemplate\>poster-1.ztd?zbytes=$range\</SegmentTemplate\>
  \<SegmentList\>
  \<S range="0-100" t="2017-04-17T17:07:10Z" /\>
  \<S range="101-200" t="2017-04-17T17:07:20Z/\>

As shown in Table 3, taking the sub-description index file poster-1.zti as an example, the URL (Uniform Resource Locator) of each segment fragment is the URL given by SegmentTemplate, and the $range therein is replaced by a range parameter value (byte range) of a corresponding segment in the SegmentList. For example, in the example as shown in Table 3, if a second segment is desired to be requested, the URL of the corresponding fragment is poster-1.ztd?zbytes=101-200. Among them, different segments correspond to different time points under the sub-description index file where the segments are located.

As an exemplary embodiment, when the index documents for the preview information include the poster primary index file and the sub-index description file, before the step 100, the method may further include:

when the client plays the program, firstly, the poster primary index file of the program is downloaded, and the sub-index description file matching a client presentation such as meeting the display resolution requirement of the client is found from the poster primary index file; correspondingly, the step 100 specifically includes: when the preview poster needs to be displayed, for example, when it is detected that a progress bar is dragged, the corresponding poster file name is parsed from the sub-index description file matching the client presentation such as meeting the display resolution requirement of the client, according to the time point of the preview, i.e., the position information about the dragging, and the poster segment in a corresponding size in the poster is downloaded according to the parsed poster file name.

At step 101, the positioned preview information is presented.

Through the embodiment of the present disclosure, the video information preview is independently completed at the client, without the participation of a player and a CDN, thus facilitating the promotion of services.

The embodiment of the present disclosure further provides a computer readable storage medium, storing computer executable instructions, which are used to execute the method for realizing a video information preview as described in the above embodiments or exemplary embodiments.

Figure 2:
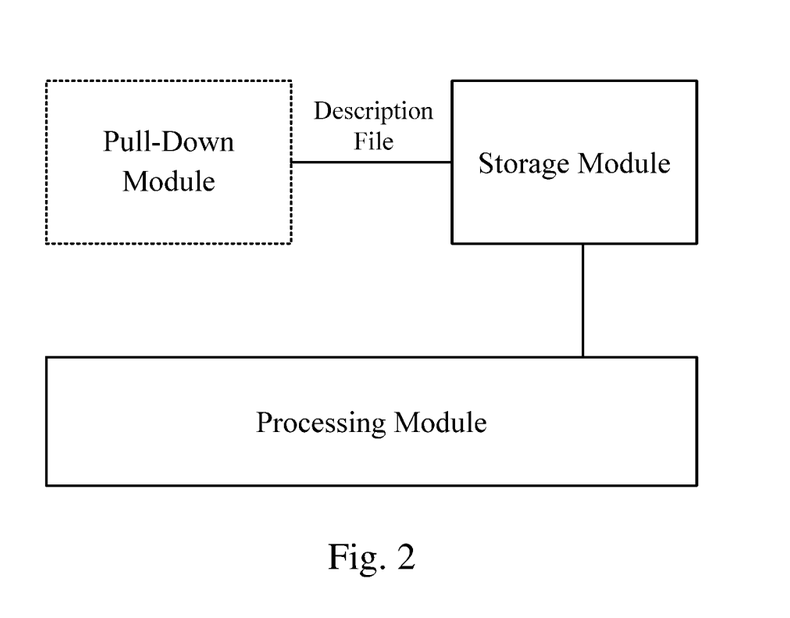
FIG. 2 is a schematic diagram of a composition structure of a client in an embodiment of the present disclosure.

FIG. 2 is a schematic diagram of a composition structure of a client in an embodiment of the present disclosure. As shown in FIG. 2, the client includes at least a processing module, a presentation module and a storage module, where the storage module is configured to store a description file, where the description file is used for describing preview information;

the processing module is configured to position corresponding preview information from the description file according to position information about dragging, when it is detected that a progress bar is dragged; and the presentation module is configured to present positioned preview information.

The client according to the embodiment of the present disclosure further includes: a pull-down module, configured to, when a video is played, pull down from a server the description file of the video played;

or, configured to, when it is detected that the progress bar is dragged, pull down from a server the description file of the video played.

Correspondingly, the preview server side may at least include a generation module, configured to describe the preview information using the description file.

As an exemplary embodiment, index documents for the preview information include one or more index files, where the one or more index files are used to describe primary index information and sub-index information.

As an exemplary embodiment, the index documents for the preview information may include a poster primary index file and a sub-index description file; the processing module is configured to:

when a program is played by the client where the processing module itself is located, download the poster primary index file of the program, and find the sub-index description file matching a client presentation such as meeting the display resolution requirement of the client from the poster primary index file; and when a preview poster needs to be presented, for example, when it is detected that a progress bar is dragged, parse the corresponding poster file name from the sub-index description file matching the client presentation such as meeting the display resolution requirement of the client, according to the time point of the preview, i.e., the position information about the dragging, and download the poster segment in a corresponding size in the poster according to the parsed poster file name.

An embodiment of the present disclosure further provides an apparatus for realizing a video information preview, including a processor, a memory, and a computer program stored on the memory and executable on the processor: when it is detected that a progress bar is dragged, positioning corresponding preview information from a description file according to position information about dragging, where the description file is used for describing the preview information; and presenting positioned preview information.

The method for realizing a video information preview will be described in detail below with reference to specific embodiments.

Figure 3:
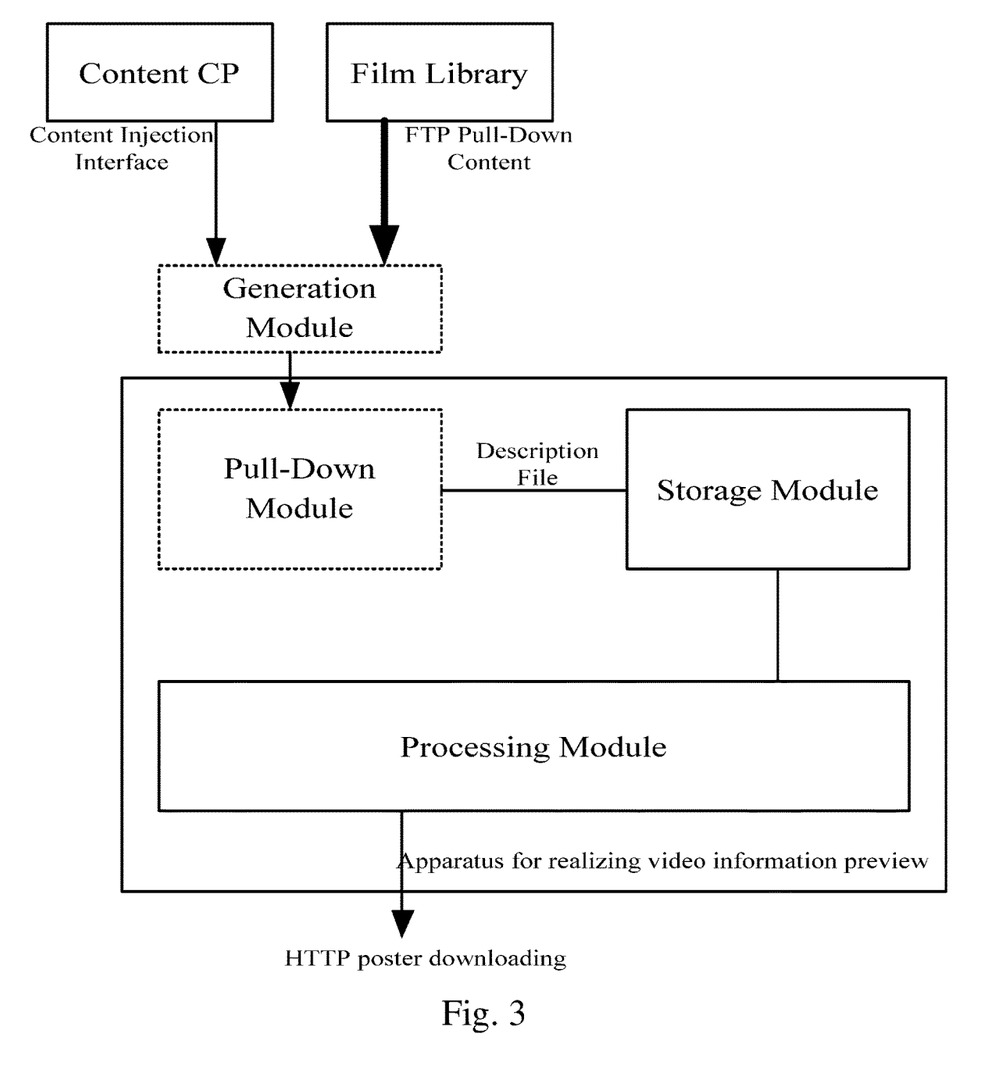
FIG. 3 is a schematic diagram of a first embodiment of an architecture for realizing a video information preview according to the present disclosure.

The first embodiment takes a VOD dragging poster as an example. FIG. 3 is a schematic diagram of a first embodiment of architecture for realizing a video information preview according to the present disclosure. As shown in FIG. 3, in the first embodiment, through a content injection interface, an apparatus for realizing a video information preview is notified of a new content injection, and the apparatus for realizing a video information preview pulls down the newly-launched VOD program from the film library, and extracts a poster from the program according to a preset time interval such as 10 seconds, and generates a poster segment.

Figure 4:
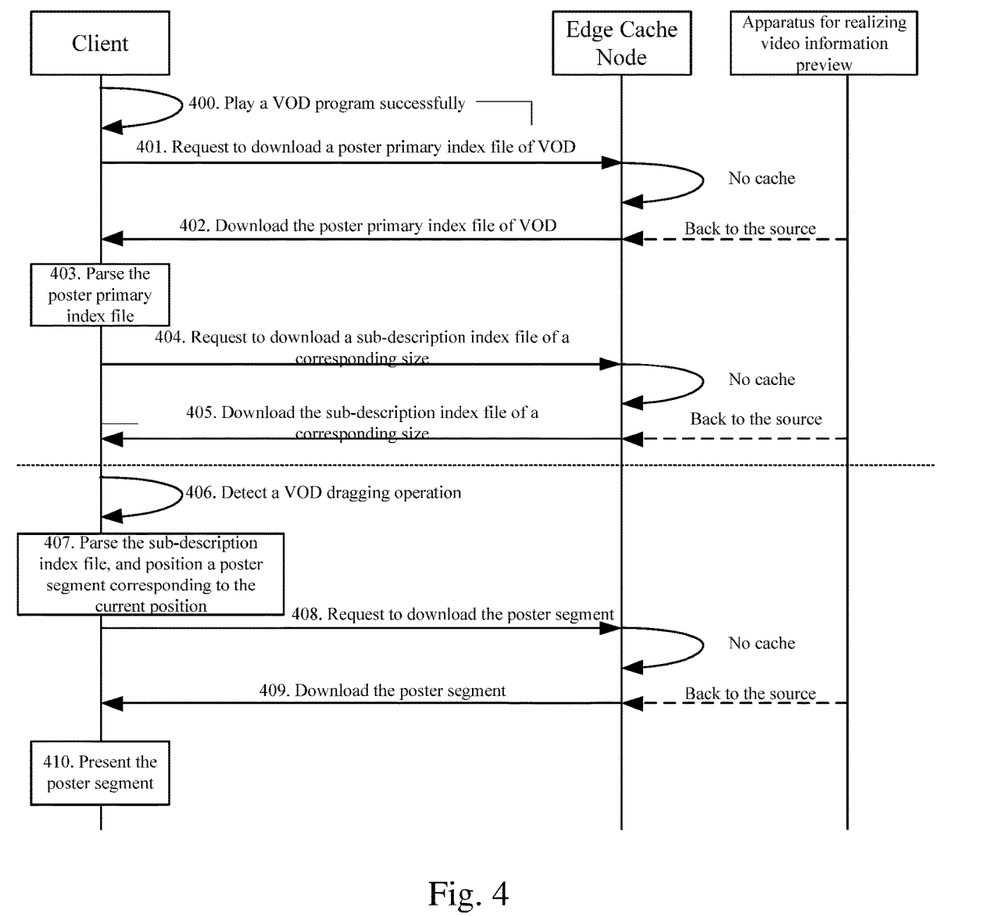
FIG. 4 is a schematic flowchart of a first embodiment of a method for realizing a video information preview according to the present disclosure.

FIG. 4 is a schematic flowchart of a first embodiment of a method for realizing a video information preview according to the present disclosure. As shown in FIG. 4, when a client plays a VOD, a method for realizing a poster preview includes:

At step 400, a user plays a VOD program on the client and plays it successfully.

At step 401, the client requests to download a poster primary index file corresponding to the currently played VOD program.

Optionally, at step 402, the edge cache node judges whether the poster primary index file corresponding to the currently played VOD program is cached locally or not, and if not, returning directly from the apparatus for realizing a video information preview back to the source HTTP downloading. It should be noted that the edge cache node may be omitted.

At step 403, the client parses the downloaded poster primary index file, and searches for a sub-description index file corresponding to the poster segment in the most suitable size for the client according to the description in the poster primary index file.

Since the segments in different sizes correspond to the virtual slice files of the segment data of different resolutions, and a resolution of the picture or mapping is given in the poster primary index file, the sub-description index file corresponding to the poster segment in the most suitable size for the client may be found according to the resolution.

At step 404, the client requests to download the corresponding sub-description index file.

Optionally, at step 405, the edge cache node judges whether the corresponding sub-description index file obtained at step 403 is cached locally or not, and if not, returning directly from the apparatus for realizing a video information preview back to the source HTTP (HyperText Transfer Protocol) downloading.

At step 406 to step 407, if it is detected that the user performs a VOD dragging operation, the downloaded sub-description index file is parsed, and the corresponding poster segment file is positioned according to the dragged position.

As shown in Table 3 above, taking the sub-description index file poster-1.zti as an example, the URL (Uniform Resource Locator) of each segment fragment is the URL given by SegmentTemplate, and the $range therein is replaced by a range parameter value (byte range) of a corresponding segment in the SegmentList. For example, in the example as shown in Table 3, if a second segment is desired to be requested, the URL of the corresponding fragment is poster-1.ztd?zbytes=101-200. Among them, different segments correspond to different time points under the sub-description index file where the segments are located.

At step 408, the corresponding poster segment file is requested to be downloaded.

Optionally, at step 409, the edge cache node judges whether the corresponding poster segment file is cached locally or not, and if not, returning directly from the apparatus for realizing a video information preview back to the source HTTP downloading.

At step 410, the downloaded poster segment is presented.

Figure 5:
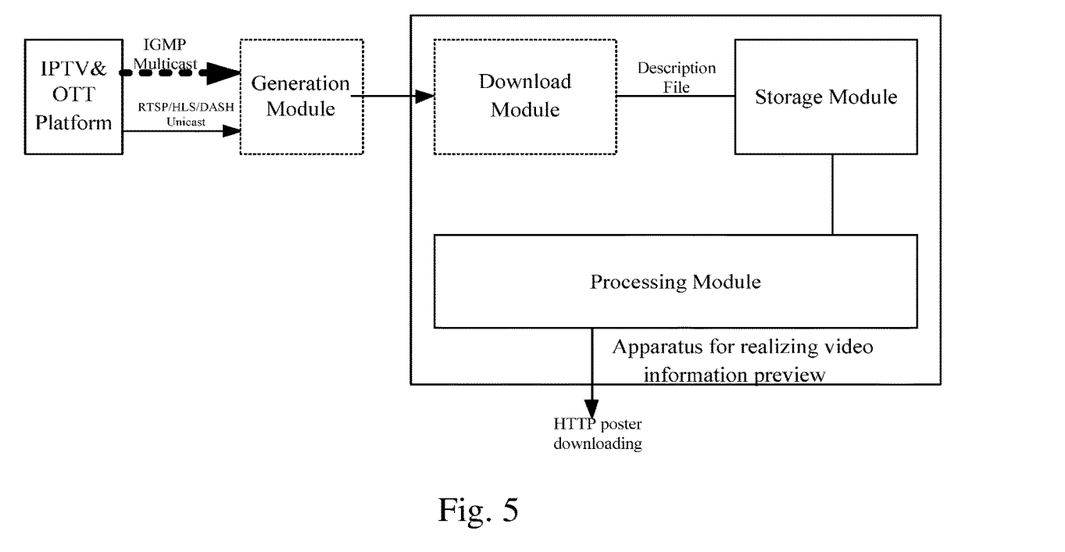
FIG. 5 is a schematic diagram of a second embodiment of an architecture for realizing a video information preview according to the present disclosure.

The second embodiment takes a live broadcast time-shifting dragging poster as an example. FIG. 5 is a schematic diagram of a second embodiment of an architecture for realizing a video information preview according to the present disclosure. As shown in FIG. 5, the apparatus for realizing a video information preview receives a channel code stream from a central node of IPTV&OTT, such as RTSP (Real Time Streaming Protocol) or RTP (Real-time Transport Protocol) unicast, IGMP (Internet Group Management Protocol) multicast, HLS (HTTP Live Streaming) unicast, dynamic adaptive streaming (DASH) unicast, etc., and extracts a poster from the channel code stream according to a preset time interval such as 10 seconds, and generates a poster segment.

Figure 6:
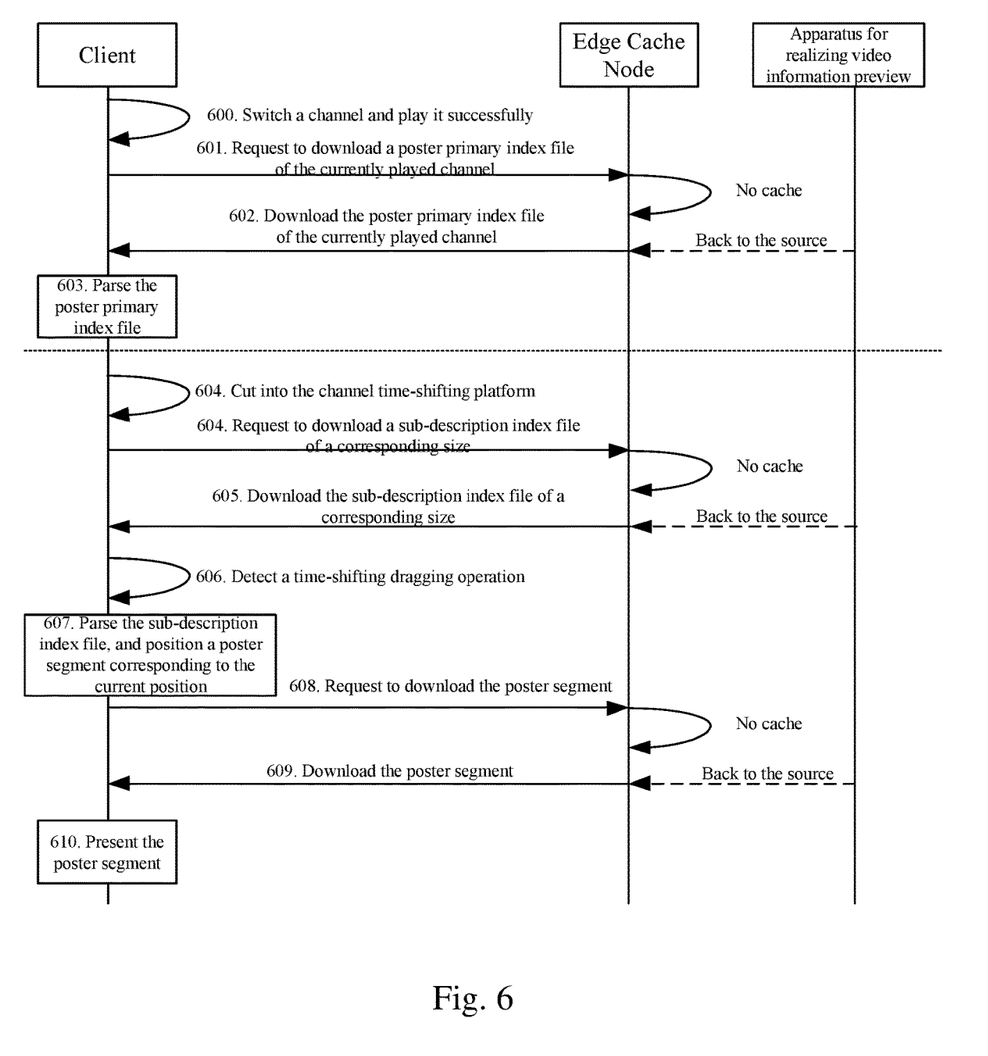
FIG. 6 is a schematic flowchart of a second embodiment of a method for realizing a video information preview according to the present disclosure.

FIG. 6 is a schematic flowchart of a second embodiment of a method for realizing a video information preview according to the present disclosure. As shown in FIG. 6, a method for previewing a live broadcast time-shifting poster at the client includes:

At step 600, a user switches the channel on the client and plays it successfully.

At step 601, the client requests to download a poster primary index file of the currently played channel.

Optionally, at step 602, the edge cache node judges whether the poster primary index file corresponding to the currently played channel is cached locally or not, and if not, returning directly from the apparatus for realizing a video information preview back to the source HTTP downloading. It should be noted that the edge cache node may be omitted.

At step 603, the client parses the downloaded poster primary index file, and searches for a sub-description index file corresponding to the poster segment in the most suitable size for the client according to the description in the poster primary index file.

At step 604, when a user cuts into the channel time-shifting platform, the client requests to download the corresponding sub-description index file, and the time-shifting range parameters are carried in the request.

Optionally, at step 605, the edge cache node judges whether the corresponding sub-description index file obtained at step 604 is cached locally or not, and if not, returning directly from the apparatus for realizing a video information preview back to the source HTTP downloading.

At step 606, it is detected that the user performs a time-shifting dragging operation.

At step 607, the downloaded sub-description index file is parsed, and the corresponding poster segment file is positioned according to the dragged position.

At step 608, the corresponding poster segment file is requested to be downloaded.

Optionally, at step 609, the edge cache node judges whether the corresponding poster segment file is cached locally or not, and if not, returning directly from the apparatus for realizing a video information preview back to the source HTTP downloading.

At step 610, the downloaded poster segment is presented.

Figure 7:
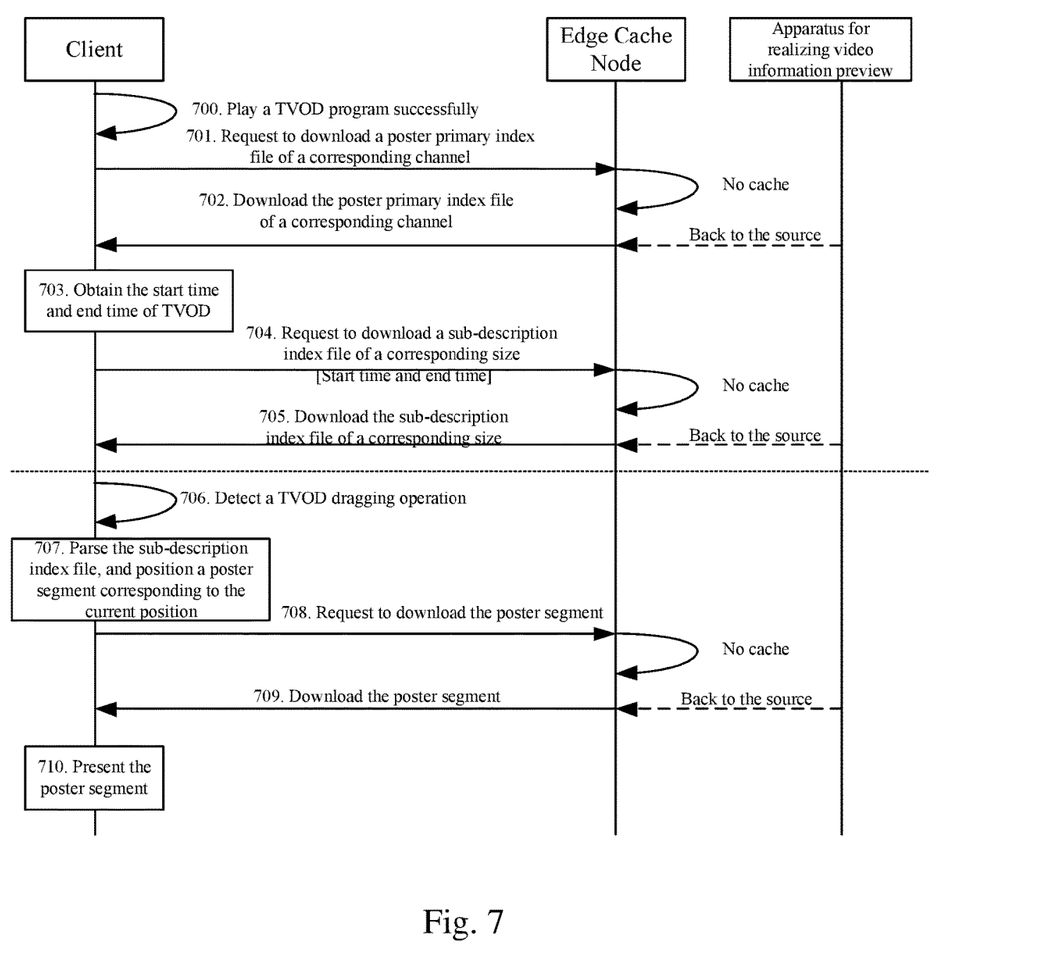
FIG. 7 is a schematic flowchart of a third embodiment of a method for realizing a video information preview according to the present disclosure.

The third embodiment takes the TVOD program poster preview as an example; the poster generation of the TVOD is consistent with the channel, and the poster segment of the channel time-shifting is used. FIG. 7 is a schematic flowchart of a third embodiment of a method for realizing a video information preview according to the present disclosure. As shown in FIG. 7, when a client plays a TVOD, a method for realizing a poster preview includes:

At step 700, a user plays a TVOD program on the client and plays it successfully.

At step 701, the client requests to download a poster primary index file corresponding to the channel of the currently played TVOD program.

Optionally, at step 702, the edge cache node judges whether the poster primary index file corresponding to the channel of the currently played TVOD program is cached locally or not, and if not, returning directly from the apparatus for realizing a video information preview back to the source HTTP downloading. It should be noted that the edge cache node may be omitted.

At step 703, the client parses the downloaded poster primary index file, and searches for a sub-description index file corresponding to the poster segment in the most suitable size for the client according to the description in the poster primary index file. The start time and the end time of the TVOD are obtained at the same time.

At step 704, the client requests to download the corresponding sub-description index file, and the start time and the end time obtained at step 703 are carried in the request.

Optionally, at step 705, the edge cache node judges whether the corresponding sub-description index file obtained at step 703 is cached locally or not, and if not, returning directly from the apparatus for realizing a video information preview back to the source HTTP (HyperText Transfer Protocol) downloading.

At step 706 to step 707, if it is detected that the user performs a TVOD dragging operation, the downloaded sub-description index file is parsed, and the corresponding poster segment file is positioned according to the dragged position.

At step 708, the corresponding poster segment file is requested to be downloaded.

Optionally, at step 709, the edge cache node judges whether the corresponding poster segment file is cached locally or not, and if not, returning directly from the apparatus for realizing a video information preview back to the source HTTP downloading.

At step 710, the downloaded poster segment is presented.

The above descriptions are only preferred examples of the present disclosure, and are not intended to limit the protection scope of the present disclosure. Any modification, equivalent substitution and improvement, etc. made within the principle of the present disclosure should be included within the protection scope defined by the claims of the present disclosure.

Obviously, it should be understood by those skilled in the art that the above modules or steps of the present disclosure may be realized by a general-purpose computing device, and they may be concentrated on a single computing device or distributed on a network composed of multiple computing devices. Alternatively, they may be implemented by program codes executable by a computing device, so that they may be stored in a storage device and executed by the computing device, and in some cases, the steps shown or described may be performed in a different order than here, or they are separately made into individual integrated circuit modules, or multiple modules or steps in them are made into a single integrated circuit module for implementation. In this way, the present disclosure is not limited to any specific combination of hardware and software.

INDUSTRIAL APPLICABILITY

According to the solution described in the embodiment of the present disclosure, when it is detected that a progress bar is dragged, corresponding preview information is positioned from a description file according to position information about dragging, where the description file is used for describing the preview information; and presenting positioned preview information. Through the solution, the video information preview is independently completed at the client, without the participation of a player and a CDN, thus facilitating the promotion of services and having a good industrial applicability.

The invention claimed is:

1. A method for realizing a video information preview, applied in a client, comprising:
 determining, when it is detected by the client that a progress bar of a video played on the client is dragged by a user, corresponding preview information from a description file to be downloaded into the client according to position information about dragging of the progress bar, wherein the description file is configured for describing the preview information of the video at different time points, the description file comprises index documents for the preview information, and the index documents for the preview information comprise a poster primary index file and a plurality of sub-index description files; wherein the poster primary index file is configured to record index information of posters of the video at different time points, and the plurality of sub-index description files are configured to record index information of thumbnails at different resolutions corresponding to one of the posters in the poster primary index file; and presenting the downloaded preview information of the video in a manner that meets display requirements of the client, wherein before said determining corresponding preview information from the description file downloaded into the client according to position information about dragging of the progress bar, the method comprises:

finding, from the plurality of sub-index description files of the poster primary index file downloaded when the video is played, a sub-index description file of thumbnails having a resolution matching a display resolution requirement of the client to download the preview information of the video when detecting the progress bar is dragged.

2. The method according to claim 1, wherein the method further comprises:

when a video is played, pulling down from a server the description file of the video played;

or, when it is detected that the progress bar is dragged, pulling down from a server the description file of the video played.

3. The method according to claim 1, wherein the poster has thumbnails at different sizes; and wherein said presenting the preview information of the video in a manner that meets display requirements of the client comprises:

presenting a thumbnail of the poster, where size of the thumbnail of the poster matches size of the display device of the client, on which the video is played.

4. The method according to claim 1, wherein the poster has thumbnails at different resolutions; and wherein said presenting the preview information of the video in a manner that meets display requirements of the client comprises:

presenting a thumbnail of the poster, where resolution of the thumbnail of the poster matches resolution of the display device of the client, on which the video is played.

5. The method according to claim 1, wherein the index information of the poster comprises the file name of the poster and the index information of the thumbnail comprises storage address of the thumbnail; and wherein said determining corresponding preview information from a description file downloaded into the client according to position information about dragging of the progress bar comprises:

determining the file name of the poster to be displayed from the poster primary index file, according to the position information about dragging of the progress bar;

determining the corresponding sub-index description file according to the file name of the poster;

obtain storage address of the corresponding thumbnail, the resolution of which matches the resolution of the display device of the client, from the corresponding sub-index description file; and downloading the thumbnail from the obtaining storage address to present the thumbnail.

6. A non-transitory computer readable storage medium, storing computer executable instructions, which are configured to execute a method for realizing a video information preview, wherein the method is applied in a client and comprises:

determining, when it is detected by the client that a progress bar of a video played on the client is dragged by a user, corresponding preview information from a description file to be downloaded into the client according to position information about dragging of the progress bar, wherein the description file is configured for describing the preview information of the video at different time points, the description file comprises index documents for the preview information, and the index documents for the preview information comprise a poster primary index file and a plurality of sub-index description files; wherein the poster primary index file is configured to record index information of posters of the video at different time points, and the plurality of sub-index description files are configured to record index information of thumbnails at different resolutions corresponding to one of the posters in the poster primary index file; and presenting the downloaded preview information of the video in a manner that meets display requirements of the client, wherein before said determining corresponding preview information from the description file to be downloaded into the client according to position information about dragging of the progress bar, the method comprises:

finding, from the plurality of sub-index description files of the poster primary index file downloaded when the video is played, a sub-index description file of thumbnails having a resolution matching a display resolution requirement of the client to download the preview information of the video when detecting the progress bar is dragged.

7. The non-transitory computer readable storage medium according to claim 6, wherein the method further comprises:

when a video is played, pulling down from a server the description file of the video played;

or, when it is detected that the progress bar is dragged, pulling down from a server the description file of the video played.

8. The non-transitory computer readable storage medium according to claim 6, wherein the poster has thumbnails at different sizes; and wherein said presenting the preview information of the video in a manner that meets display requirements of the client comprises:

presenting a thumbnail of the poster, where size of the thumbnail of the poster matches size of the display device of the client, on which the video is played.

9. The non-transitory computer readable storage medium according to claim 6, wherein the poster has thumbnails at different resolutions; and wherein said presenting the preview information of the video in a manner that meets display requirements of the client comprises:

presenting a thumbnail of the poster, where resolution of the thumbnail of the poster matches resolution of the display device of the client, on which the video is played.

10. The non-transitory computer readable storage medium according to claim 6, wherein the index information of the poster comprises the file name of the poster and the index information of the thumbnail comprises storage address of the thumbnail; and wherein said determining corresponding preview information from a description file downloaded into the client according to position information about dragging of the progress bar comprises:

determining the file name of the poster to be displayed from the poster primary index file, according to the position information about dragging of the progress bar;

determining the corresponding sub-index description file according to the file name of the poster;

obtain storage address of the corresponding thumbnail, the resolution of which matches the resolution of the display device of the client, from the corresponding sub-index description file; and downloading the thumbnail from the obtaining storage address to present the thumbnail.

* * * * *